May 30, 1933.   H. C. BRITTON   1,911,794
PROCESS FOR THE PRODUCTION OF SODIUM SESQUICARBONATE
Filed March 25, 1929
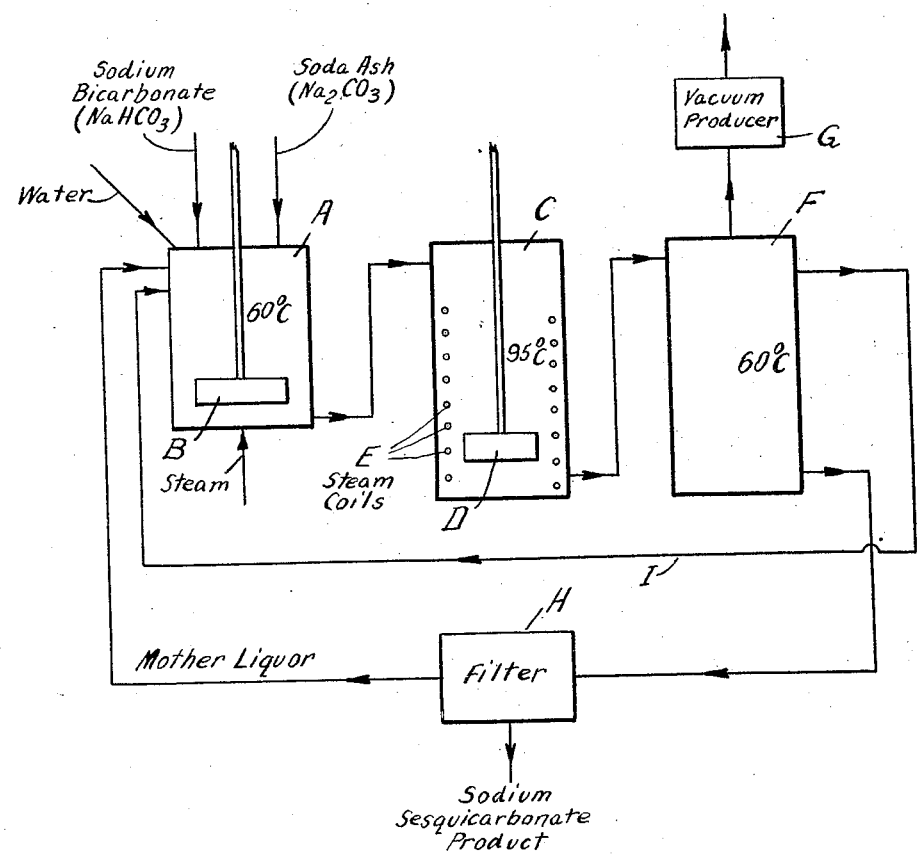
INVENTOR
Harry C. Britton
BY
ATTORNEY Patented May 30, 1933

1,911,794

UNITED STATES PATENT OFFICE

HARRY C. BRITTON, OF SYRACUSE, NEW YORK, ASSIGNOR TO SOLVAY PROCESS COMPANY, OF SOLVAY, NEW YORK, A CORPORATION OF NEW YORK

PROCESS FOR THE PRODUCTION OF SODIUM SESQUICARBONATE

No Drawing.   Application filed March 25, 1929. Serial No. 349,907.

This invention relates to a method of producing sodium salts, and more particularly to an improvement in the process for the continuous production of sodium sesquicarbonate described in United States Patent No. 1,748,739 to Carl Sundstrom and George N. Terziev, Serial No. 100,540, dated February 25, 1930.

In the process of said U. S. Patent No. 1,748,739, a large or dominant pool of a saturated solution of sodium sesquicarbonate containing suspended solid sodium sesquicarbonate is used as a vehicle for the production of sodium sesquicarbonate from its constituents, sodium carbonate, carbon dioxide and water or sodium carbonate, sodium bicarbonate and water. The raw materials are added to the pool and sodium sesquicarbonate is formed and precipitated. A portion of the pool is withdrawn continuously and the precipitate filtered therefrom. The reactions taking place may be illustrated by the following equations:

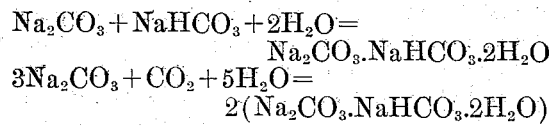

One of the important characteristics of a commercially satisfactory product is that it be made up of large crystals and that there is a substantial uniformity in the size of the crystals, and my invention comprises an improvement in the above process whereby an improved product with respect to crystal size and uniformity is obtained. This improved result is attained by a new mode of operating the above process with respect to the temperatures at which certain of the steps are carried out. In particular, the reacting materials are brought together at one temperature and are heated to a higher temperature and then cooled prior to recovery of the sodium sesquicarbonate product.

A preferred mode of carrying the present invention into practice is to start with an aqueous solution saturated with respect to sodium sesquicarbonate and containing solid particles of the sesquicarbonate in suspension. The solution contains sodium carbonate and sodium bicarbonate in such concentration that sodium sesquicarbonate will not dissolve therein. Any suitable reaction vessel may be employed to hold the solution. The solution is at a temperature within the range of temperatures at which sodium sesquicarbonate is stable in the presence of solution but which will permit the temperature of the solution to be raised about 25° C. without leaving that temperature range. A temperature within the range from about 60° C. to 80° C. is generally most satisfactory, and a temperature of 60° C. is preferably employed. The liquor is heated in any suitable manner to maintain the desired temperature and is agitated while the reactants, sodium carbonate, sodium bicarbonate, or the equivalent thereof, and water, are added in amounts corresponding approximately to the composition of sodium sesquicarbonate, which may be represented as

As the aforesaid operation continues, the sesquicarbonate is precipitated. The mixture of saturated solution and precipitated sesquicarbonate is then heated through a temperature range of about 30° C., for example to a temperature about 25 to 35° C. above the temperature at which the materials are mixed. For example, when the mixture is made up as above described at a temperature of 60° C., it is subsequently heated to a temperature of about 95° C. Above a certain temperature the sesquicarbonate is not stable in the presence of solution and the mixture, therefore, should not be heated above that temperature. Accordingly, the temperature at which the reactants are mixed should be so chosen as to allow the material to be heated about 25° C. or more without going above the temperatures at which the sesquicarbonate is stable.

After the mixture has been heated, it is then cooled in any suitable manner (such as by means of heat transfer to a cooling fluid or by exposing the heated liquor to a vacuum which causes a portion of it to boil away and thus cools the remainder) preferably through about the same temperature range through which it was heated, i. e., in the above example the mixture is preferably cooled to 60° C., and solid sodium sesquicarbonate is then separated from the liquor by filtration or in any other suitable manner. The liquor is preferably not completely freed of its content of solid material, but a portion of the sesquicarbonate is left in the liquor, which may then serve as the medium for the transformation of further quantities of sodium carbonate and carbon dioxide or sodium bicarbonate and water by repeating the operations described above; or a part of the liquor may be filtered and another part containing solid material added to the filtered part and the resulting liquor may be employed as the medium for the production of additional quantities of sesquicarbonate.

An apparatus suitable for carrying out my invention is diagrammatically illustrated in the accompanying drawing. In the drawing, A designates a tank containing a saturated sesquicarbonate solution containing suspended solid sodium sesquicarbonate, maintained at approximately 60° C. Soda ash, sodium bicarbonate and water are fed into the tank A in equivalent proportions; i. e., about one molecular weight of sodium bicarbonate and two molecular weights of water for each molecular weight of sodium carbonate. Some of the water may, if desired, be introduced as steam through the direct steam inlet, whereby heat for the desired temperature maintenance is simultaneously supplied. The tank is also provided with an agitator B which operates to insure a thorough mixing and agitation of the materials.

The contents of tank A are then transferred to tank C. Tank C is provided with an agitator D and with a means for heating the contents. This heating means may consist of steam coils located within the tank, as indicated at E. The material in C is heated from 60° C. to about 95° C. with simultaneous agitation. The thus heated and agitated material is transferred to tank F where it is cooled to about 60° C. This cooling may be accomplished by producing a decreased pressure above the solution in F by means of vacuum producer G whereby a portion of the liquid is boiled off and the remainder cooled thereby. The cooled material in F is drawn to filter H, where solid sodium sesquicarbonate is separated from the liquor and recovered as a product, and the mother liquor still containing a quantity of the solid sesquicarbonate in suspension, is returned to tank A, to again serve as a medium for the production of further quantities of the sesquicarbonate product. The sesquicarbonate product recovered from the filter H may be dried or otherwise treated as desired. In place of or supplemental to leaving a part of the solid sesquicarbonate in the liquor passed through filter H, a part of the liquor in tank F containing solid sodium sesquicarbonate may be transferred by means of pipe I to tank A where it is mixed with mother liquor from filter H to form the saturated solution of sodium sesquicarbonate containing solid particles of the sesquicarbonate suitable for the production of further quantities of sodium sesquicarbonate.

The following detailed data relate to one example of the production of sodium sesquicarbonate in accordance with my invention. A charge of about 6 cubic meters of a saturated solution of sodium sesquicarbonate containing solid particles of the same was placed in a tank. The charge was maintained at a temperature of 60° C., while 900 pounds of soda ash and about 800 lbs. of moist centrifuged sodium bicarbonate were added with thorough mixing. The addition and mixing of these materials was accomplished in about 30 minutes. The mixture was brought up to 95° C. during a period of about 30 minutes and then discharged to a vacuum pan and cooled to 60° C., which operation consumed about 10 minutes. The sesquicarbonate product which was separated from the cooled materials and dried, consisted of relatively large and uniform crystals.

The process has been described as a batch process, but it is apparent that it may be carried out as a continuous process by making minor changes in the apparatus described, which are apparent to one skilled in the art. Numerous other modifications may be made in the process and apparatus as described above without departing from my invention. For example, heat may be transferred from a charge of material leaving C to a subsequent charge of material passing to C, to heat one charge and simultaneously cool the other. As indicated above, in place of reacting soda ash, sodium bicarbonate, and water, equivalent proportions of the components of sodium sesquicarbonate as soda ash, carbon dioxide and water may be added to the reaction medium in A and the resulting mixture subsequently treated as described. In this case about one molecular weight of carbon dioxide ($CO_2$) and five molecular weights of water are employed for every three molecular weights of soda ash ($Na_2CO_3$).

I claim:

1. The improvement in the process for the production of sodium sesquicarbonate by adding approximately equivalent proportions of the components of sodium sesquicarbonate to a saturated aqueous solution of sodium sesquicarbonate containing suspended solid sodium sesquicarbonate which comprises heating the mixture through a temperature range of about 30° C. while maintaining solid sodium sesquicarbonate in suspension therein, cooling the thus heated mixture through approximately the same temperature range, and separating solid sodium sesquicarbonate from the cooled mixture.

2. The improvement in the process for the production of sodium sesquicarbonate by adding approximately equivalent proportions of sodium carbonate, sodium bicarbonate, and water to a saturated aqueous solution of sodium sesquicarbonate containing suspended solid sodium sesquicarbonate which comprises heating the mixture through a temperature range of about 30° C. while maintaining solid sodium sesquicarbonate in suspension thereof, cooling the thus heated mixture through approximately the same temperature range, and separating solid sodium sesquicarbonate from the cooled mixture.

3. The process for the production of sodium sesquicarbonate which comprises adding approximately equivalent proportions of sodium carbonate, sodium bicarbonate, and water to a saturated aqueous solution of sodium sesquicarbonate containing suspended solid sodium sesquicarbonate at about 60° C., heating the mixture to about 95° C., cooling the thus heated mixture to about 60° C., and separating solid sodium sesquicarbonate from the cooled mixture, and during the aforesaid steps of heating and cooling maintaining solid sodium sesquicarbonate suspended in said mixture.

4. The improvement in the process for the production of sodium sesquicarbonate by adding approximately equivalent proportions of the components of sodium sesquicarbonate to a saturated aqueous solution of sodium sesquicarbonate which comprises heating the mixture to a higher temperature which is below the decomposition temperature of sodium sesquicarbonate while maintaining solid sodium sesquicarbonate in suspension therein, cooling the thus heated mixture and separating solid sodium sesquicarbonate from the cooled mixture.

In witness whereof I have hereunto set my hand.

HARRY C. BRITTON.